(No Model.) 2 Sheets—Sheet 2.
G. C. HALE.
HARNESS SUSPENSION DEVICE.
No. 412,084. Patented Oct. 1, 1889.
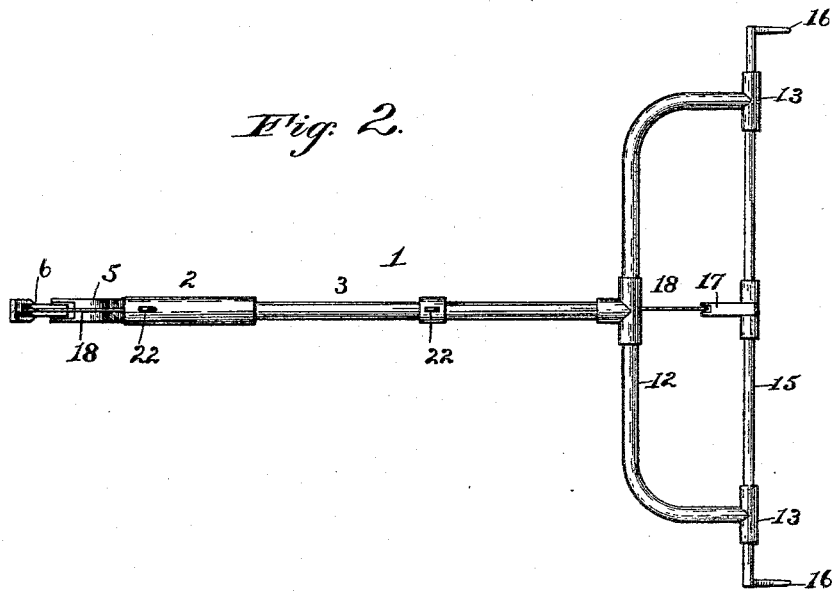
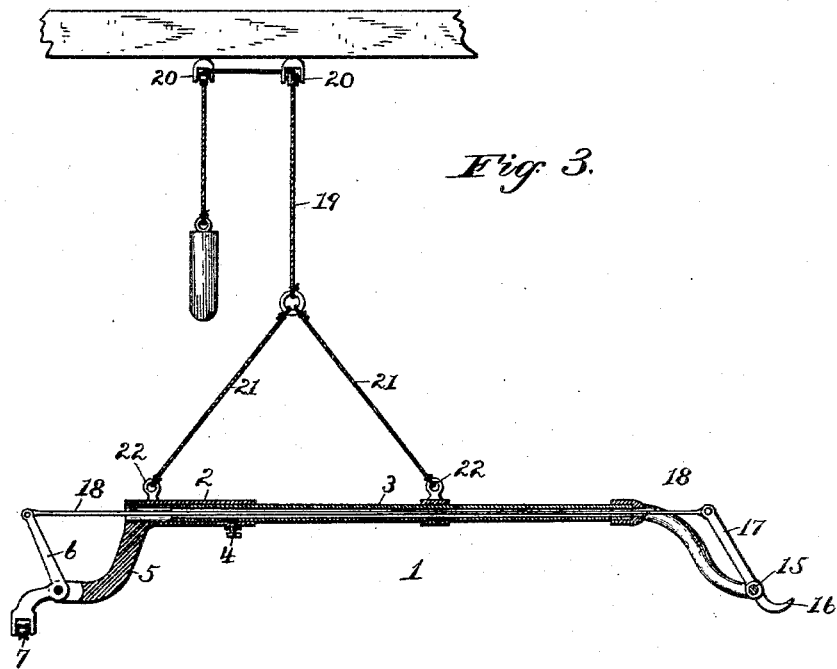
WITNESSES:
Percy C. Bowen.
James S. Smith.
INVENTOR
George C. Hale
By Edson Bro's,
Attorneys

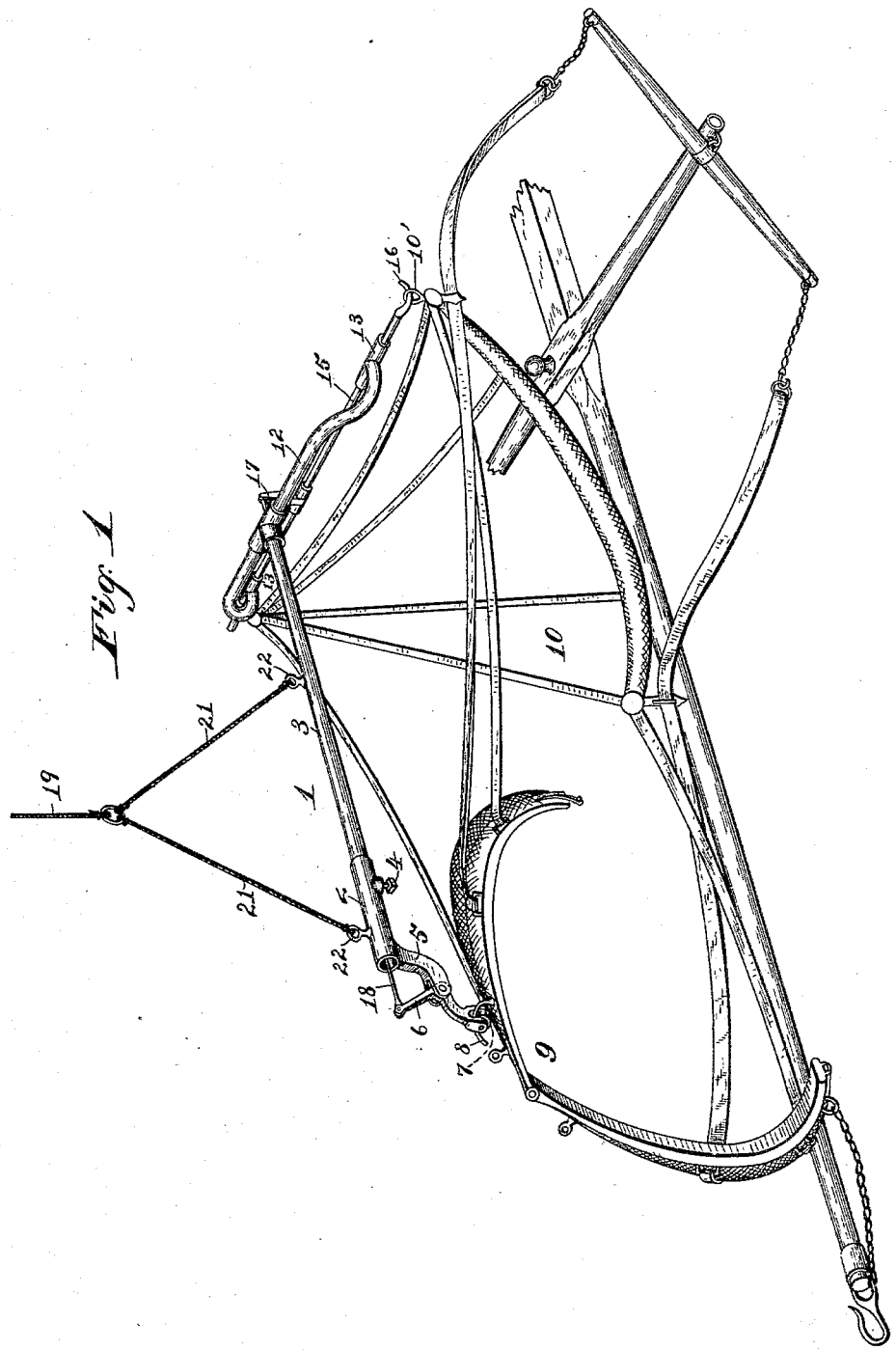

UNITED STATES PATENT OFFICE.

GEORGE C. HALE, OF KANSAS CITY, MISSOURI.

HARNESS SUSPENSION DEVICE.

SPECIFICATION forming part of Letters Patent No. 412,084, dated October 1, 1889.

Application filed April 4, 1889. Serial No. 305,991. (No model.)

*To all whom it may concern:*

Be it known that I, GEORGE C. HALE, a citizen of the United States, residing at Kansas City, in the county of Jackson and State of Missouri, have invented certain new and useful Improvements in Harness Suspension Devices; and I do hereby declare the following to be a full, clear, and exact description of the invention, such as will enable others skilled in the art to which it appertains to make and use the same.

My present invention relates to a device for suspending the harness of fire-engines or other like apparatus over the place occupied by the horse when attached to the engine; and it has for its object, first, to automatically lower one part or the rear end of the suspended harness on the animal as it stands beneath the same when the other part or collar of the harness is drawn down by the attendant; second, to provide for the adjustment of the suspension device to adapt it for suspending harnesses of different sizes for use on horses of different lengths, and, finally, to promote simplicity and durability of construction and cheapness of manufacture.

With these ends in view my invention consists, primarily, of a longitudinal suspension-bar having a lever fulcrumed thereon at its front end, which is arranged to engage the collar of a fire-engine harness in such a manner that the collar is suspended in an open position and the lever can be quickly disengaged from the collar. This lever is connected by an intermediate cord, rod, or other suitable device with another harness-engaging device, preferably a rock-shaft, which is arranged at the opposite extremity of the suspension-bar and is journaled in suitable bearings thereon. The rock-shaft carries suitable devices—as, for instance, hooks—which engage rings on the rear part of the harness, so as to suspend the latter in such a position that the animal can walk beneath the harness without coming in contact therewith, and the rock-shaft is normally turned or held in such a position that its harness-engaging devices will not release the harness by the weight of the collar on the lever at the front of the suspension device. When the collar is lowered by the attendant, the lever is released, which thus allows the rock-shaft to be turned by the weight of that part of the harness suspended thereon, so as to lower the rear part of the harness upon the horse almost simultaneously with the adjustment of the collar on the animal.

It is well known to those skilled in the art to which my invention relates that the traces of a fire-engine harness are normally attached to the engine when standing in the engine-house; and by the use of my device, in which the entire harness is lowered on the animal when the collar is pulled down, the act of hitching up can be more easily and quickly performed than can be accomplished with other prior suspension devices which employ a series of depending hooks that are connected to different parts of the harness and which require to be separately detached by hand. To provide for suspending harnesses of different sizes for use on horses of different lengths, I employ a sectional suspension-rod, which is adjustable or extensible longitudinally, so that its length can be varied to properly suspend harnesses of different sizes. To the longitudinal rod of the suspension device is connected a weighted cord, which passes through suitable guide-sheaves on the ceiling, and this cord is adapted to automatically raise the suspension device out of the way of the engine when the harness is disengaged therefrom. The suspending-cord is connected to the longitudinal rod at two points, near the front end and middle, and, by reason of the simultaneous releasing of the harness from the front and rear ends of the bar and the manner of connecting the cord thereto, the suspension device remains in a horizontal position when it is elevated toward the ceiling after the harness has been detached.

To enable others to understand my invention, I will now proceed to describe the same in connection with the accompanying drawings, in which—

Figure 1 is a perspective view of my improved harness suspension device, showing a pole of an engine or like apparatus and a harness attached to the pole and suspended from my improved suspension device or hanger. Fig. 2 is a plan view of the hanger or suspension device, showing the harness and weighted cord detached therefrom. Fig. 3 is a longitudinal sectional view through the longitudinal bar.

Like numerals of reference denote corresponding parts in all the figures of the drawings, referring to which—

1 designates the longitudinal bar of my improved suspension device or hanger for the harness of fire-engines or other like apparatus. This longitudinal rod is hollow in the form of a tube, and is made in two sections 2 3, which are fitted together so as to be capable of adjustment longitudinally with respect to each other, and they are held in fixed positions with relation to each other by a binding or set screw 4, which works in a threaded aperture in one section and binds or impinges against the other section. The front member or section 2 of this extensible rod is preferably shorter than the other member, and is provided with a depending hanger 5, which is curved or projected forwardly, as shown, the free end of which terminates at a point in advance of the tubular rod, but out of line therewith. To the free end of this hanger is pivoted a vertically-disposed lever 6, having its lower end bifurcated and provided with a friction-roller 7, over which is adapted to pass a hook 8, that is fixed to one side or member of a centrally-jointed divided collar 9, constituting a part of a fire-engine harness 10. This hook is arranged to be easily and quickly withdrawn from engagement with the lever, and when it is engaged therewith the weight of the collar throws the upper end of the lever away from the tubular rod to cause it to pull on the rock-shaft and hold the latter in such a position that it will not become disengaged from the rear part of the harness until the lever is relieved of the weight of the collar.

A transverse bar 12 is rigidly attached to the rear end of the longitudinal bar 1, and the free ends of said transverse bar are bent or curved downwardly and rearwardly from said longitudinal bar, aligned bearings 13 being secured to or formed integral with the extremities of the transverse bar. In these bearings is journaled a rock-shaft 15, which is extended at its ends beyond said bearings and provided with devices—as, for instance, hooks 16—for engaging the rear end of the harness 10.

In order to spread the harness apart, so that it can be readily dropped on the animal, and to elevate the outer trace to permit the horse to pass beneath the harness without obstruction or hinderance from it, I have provided the rock-shaft having at widely-separated points the devices for engaging the rear end of the harness, two rings 10' being provided, one at the point of juncture of the breeching and breech-strap with the outer trace, and the other at the juncture of the back and breeching-straps. (See Fig. 1.)

To the middle of the rock-shaft is secured an arm 17, arranged in line with the passage of the tubular longitudinal rod 1, and this arm and the lever 6 are connected by a cord, rod, or other suitable connection 18, which passes centrally through the tubular rod 1.

19 is a weighted cord for elevating the suspension device or hanger out of the way of the engine after the harness has been disengaged therefrom. This cord passes through suitable guide-sheaves 20 on the ceiling, and at one end it has two branches 21, which are connected to eyes 22, secured, respectively, to the front end and middle of the longitudinal rod.

In operation the weight of the harness counterbalances the weight on the elevating-cord to suspend the frame or hanger at a proper elevation, and the harness and collar thereof are spread apart and opened above the position occupied by the horse when attached to the engine, the traces and one part of the collar being attached to the engine in the usual well-known manner. When the collar is drawn down by the attendant and fastened on the animal after the latter has assumed the proper position beneath the harness, when an alarm of fire is sounded, the vertical lever 6 is released and is drawn rearwardly by the strain or pull thereon of the cord or connection between the rock-shaft and said lever, this strain being caused by the weight of the harness on the rock-shaft; but as the position of the lever is reversed the rock-shaft is free to turn in its bearings and thus pull the lever rearwardly and turn the hooks thereof into a position where the rings 10' of the rear part of the harness is free to slip off the rock-shaft and thus lower the rear part of the harness upon the horse. The harness is thus almost instantaneously lowered on the horse and freed from the suspension device by the simple act of fastening the collar on the animal, and as soon as the harness is released the suspension device or hanger is automatically elevated out of the path of the engine by the weighted cord.

I am aware that changes in the form and proportion of parts and details of construction of the mechanism herein shown and described as an embodiment of my invention can be made without departing from the spirit or sacrificing the advantages thereof, and I therefore reserve the right to make such alterations as fairly fall within the scope of my invention.

Having thus fully described my invention, what I claim as new, and desire to secure by Letters Patent, is—

1. A harness suspension device consisting of a longitudinal unbroken rod or bar, a lever fulcrumed on one end of said bar and adapted to detachably engage one part of the harness to be suspended, a device movably supported at the opposite end of said bar for engaging the other end or part of the harness, and an intermediate cord or rod connected to said device and the lever, all arranged and combined for service substantially as herein shown and described.

2. A harness suspension device consisting of a longitudinal rod or bar, a lever fulcrumed on one end of said rod or bar and arranged to detachably engage one part of the harness to be suspended, and a rock-shaft having separated harness-engaging devices for spreading the parts of the harness laterally and connected by an intermediate cord or rod with the lever, to be held in such position by the latter and the weight of the harness as to engage and suspend the harness, substantially as and for the purpose described.

3. In a harness suspension device, the combination of a hollow longitudinal rod or bar, a vertically-disposed lever fulcrumed on the front end thereof, a rock-shaft journaled on the opposite end of said rod or bar, a cord or rod passing through the hollow longitudinal bar and connecting the lever and rock-shaft, and a weighted cord or rod connected to the hollow longitudinal bar, substantially as and for the purpose described.

4. A suspension device for harness, consisting of a longitudinally-extensible bar or rod, a lever fulcrumed on one end thereof, and a rock-shaft having devices for engaging the harness and connected by an intermediate cord or rod with said lever, substantially as and for the purpose described.

5. A suspension device for harness, consisting of a longitudinal bar or rod, a hanger fixed to the rod, a lever fulcrumed at an intermediate point of its length in the hanger and constructed at its lower end to detachably engage the collar of a harness, the transverse bar fixed to the opposite end of the longitudinal bar and having the bearings, and a rock-shaft journaled in said bearings and connected by an intermediate cord or rod with the lever, substantially as and for the purpose described.

6. A suspension device for harness, consisting of a tubular bar or rod made in sections which are adjustably fitted together and held in fixed relation to each other by a binding-screw, a hanger fixed to one of the sections of said rod and carrying a lever, a rock-shaft journaled on the other section of the rod, and a cord or rod passing through the tubular rod and connected to the lever and rock-shaft, substantially as and for the purpose described.

7. In a harness suspension device, the combination, with a longitudinal bar or rod, of two catches or hooks pivotally supported at opposite ends of said bar or rod and adapted to be detachably connected to the ends of a set of harness, and an intermediate cord or rod connected to said hooks or catches to adapt the same to move or operate simultaneously, whereby one hook or catch serves through the intermediate rod or cord to hold the other hook or catch in position when both are engaged with the harness, and one hook or catch is automatically operated to lower the harness when that part of the harness connected to the other hook is pulled down on the animal, as set forth.

In testimony whereof I affix my signature in presence of two witnesses.

GEORGE C. HALE.

Witnesses:
F. H. AUSTIN,
M. A. CALKINS.